United States Patent
Esseghir et al.

(10) Patent No.: US 10,654,997 B2
(45) Date of Patent: May 19, 2020

(54) BUFFER TUBES FOR FIBER OPTIC CABLES

(71) Applicant: Dow Global Technologies LLC, Midland, MI (US)

(72) Inventors: Mohamed Esseghir, Collegeville, PA (US); Gangwei Sun, Shanghai (CN); Yonghua Gong, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 91 days.

(21) Appl. No.: 16/086,682

(22) PCT Filed: Mar. 25, 2016

(86) PCT No.: PCT/CN2016/077335
§ 371 (c)(1),
(2) Date: Sep. 20, 2018

(87) PCT Pub. No.: WO2017/161560
PCT Pub. Date: Sep. 28, 2017

(65) Prior Publication Data
US 2019/0048177 A1    Feb. 14, 2019

(51) Int. Cl.
*C08L 23/12* (2006.01)
*C08L 23/06* (2006.01)
*G02B 6/44* (2006.01)
*H01B 3/44* (2006.01)
*C08L 23/14* (2006.01)
*C08L 53/00* (2006.01)

(52) U.S. Cl.
CPC ............... *C08L 23/12* (2013.01); *C08L 23/06* (2013.01); *C08L 23/14* (2013.01); *G02B 6/443* (2013.01); *H01B 3/441* (2013.01); *C08L 53/00* (2013.01); *C08L 2205/035* (2013.01); *C08L 2205/08* (2013.01); *C08L 2207/062* (2013.01)

(58) Field of Classification Search
CPC .................. C08L 23/12; C08L 23/06
USPC ........................................... 524/505
See application file for complete search history.

(56) References Cited

U.S. PATENT DOCUMENTS

| | | | |
|---|---|---|---|
| 5,574,816 | A | 11/1996 | Yang et al. |
| 5,616,627 | A | 4/1997 | Sakurai et al. |
| 6,525,157 | B2 | 2/2003 | Cozewith et al. |
| 6,960,635 | B2 | 11/2005 | Stevens et al. |
| 7,355,089 | B2 | 4/2008 | Chang et al. |
| 8,476,366 | B2 | 7/2013 | Walton et al. |
| 8,824,845 | B1 | 9/2014 | Risch |
| 9,303,156 | B2 | 4/2016 | Weeks et al. |
| 2006/0199930 | A1 | 9/2006 | Shan et al. |
| 2007/0167578 | A1 | 7/2007 | Arriola et al. |
| 2008/0269412 | A1 | 10/2008 | Carnahan et al. |
| 2008/0311812 | A1 | 12/2008 | Arriola et al. |
| 2011/0082258 | A1 | 4/2011 | Walton et al. |
| 2011/0313108 | A1 | 12/2011 | Shan et al. |
| 2015/0010765 | A1 | 1/2015 | Munro et al. |
| 2016/0289433 | A1 | 10/2016 | Seven et al. |

FOREIGN PATENT DOCUMENTS

| | | | |
|---|---|---|---|
| WO | 2005/090426 A1 | | 9/2005 |
| WO | 2009/012215 A1 | | 1/2009 |
| WO | 2010/076231 A1 | | 7/2010 |
| WO | 2013/148035 A1 | | 10/2013 |
| WO | WO2013/148035 | * | 10/2013 |
| WO | 2015/054896 A1 | | 4/2015 |
| WO | WO2015/094516 | * | 6/2015 |

* cited by examiner

Primary Examiner — Deve V Hall

(57) ABSTRACT

Buffer tubes made from a composition comprising: (A) polypropylene, (B) high density polyethylene (HDPE), (C) propylene-ethylene copolymer (PE copolymer), (D) olefin block composite, and (E) optionally, one or more of a nucleating agent, filler and additive, exhibit reduced stress whitening as compared to buffer tubes made from conventional polypropylene compositions.

14 Claims, No Drawings

BUFFER TUBES FOR FIBER OPTIC CABLES

FIELD OF THE INVENTION

In one embodiment this invention relates to reducing stress whitening in the buffer tubes used in fiber optic cables.

BACKGROUND OF THE INVENTION

Buffer tubes are used in the construction of fiber optic cables to house and protect the optical fibers. Typically, these tubes are filled with a hydrocarbon gel or grease to suspend and protect the fiber from water/moisture, and they have stringent requirements for high crush resistance, resistance to micro-bending, low brittleness temperature, good grease compatibility, impact resistance and low post-extrusion shrinkage. Materials used in the manufacture of the buffer tubes include polybutylene terephthalate (PBT), high crystallinity polypropylene(PP) modified for impact resistance, and to a lesser extent, high density polyethylene (HDPE). PBT is a high cost material and cable manufacturers are looking for cost-effective alternatives.

PP as a material for use in buffer tube construction is a market trend in the fiber optical cable field because of its desirable mechanical properties and cost advantage. PP has better flexibility than PBT, and it is easier to use during installation of the cable. High crystallinity PP modified with an elastomer phase has been proposed in the past but further improvements are still desired, such as grease resistance and high excess fiber length (EFL) which is related to the large post shrinkage. Another issue associated with the utilization of PP is that stress whitening can occur when PP is mechanically deformed. Such deformation causing whitening can occur during installation of the optical cable. Accordingly, a need exists for PP buffer tubes that have reduced stress whitening.

U.S. Pat. No. 8,824,845 B1 teaches a method for reducing buffer tube stress whitening by constructing the buffer tube from a composition that comprises (1) at least about 80 weight percent homopolymer polypropylene and/or polypropylene copolymer, and (2) between 100 and 10,000 parts per million (ppm) titanium dioxide.

WO 2010/076231 teaches a cable layer comprising a propylene polymer composition comprising (a) a polypropylene, (b) an elastomeric copolymer comprising units derived from propylene and ethylene and/or C4 to C20 α-olefin, and (c) a polar ethylene polymer, wherein the propylene polymer composition has a gel content of equal or more than 0.20 wt %.

US 2011/0313108 A1 teaches a composition comprising (A) polypropylene, (B) polyethylene, and (C) at least one crystalline block composite comprising (1) a crystalline ethylene based polymer, (2) a crystalline alpha-olefin based polymer, and (3) a block copolymer comprising a crystalline ethylene block and a crystalline alpha-olefin block.

SUMMARY OF THE INVENTION

In one embodiment the invention is a composition comprising:
(A) polypropylene,
(B) high density polyethylene (HDPE),
(C) propylene-ethylene copolymer (PE copolymer),
(D) olefin block composite, and
(E) optionally, one or more of a nucleating agent, filler and additive.

In one embodiment the composition consists essentially of components (A), (B), (C) and (D). In one embodiment the composition consists of components (A), (B), (C) and (D). In one embodiment one or more of a nucleating agent, filler or additive is present in the composition.

In one embodiment the invention is a protective element for a fiber optic cable, the protective element made from a composition comprising:
(A) polypropylene,
(B) HDPE,
(C) PE copolymer,
(D) olefin block composite, and
(E) optionally, one or more of a nucleating agent, filler and additive.

In one embodiment the protective element is a buffer tube. In one embodiment the protective element is an exterior jacket for a fiber optic cable.

In one embodiment the invention is a fiber optic cable comprising a protective element made from a composition comprising:
(A) polypropylene,
(B) HDPE,
(C) PE copolymer,
(D) olefin block composite, and
(E) optionally, one or more of a nucleating agent, filler and additive.

DETAILED DESCRIPTION OF THE PREFERRED EMBODIMENT

Definitions

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., 1 or 2; or 3 to 5; or 6; or 7), any subrange between any two explicit values is included (e.g., 1 to 2; 2 to 6; 5 to 7; 3 to 7; 5 to 6; etc.).

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

Any reference to the Periodic Table of Elements is that as published by CRC Press, Inc., 1990-1991. Reference to a group of elements in this table is by the new notation for numbering groups.

Unless stated to the contrary, implicit from the context, or customary in the art, all parts and percents are based on weight and all test methods are current as of the filing date of this disclosure.

"Polymer" means a compound prepared by reacting (i.e., polymerizing) monomers, whether of the same or a different type. The generic term polymer thus embraces the term "homopolymer", usually employed to refer to polymers prepared from only one type of monomer, and the term "interpolymer" as defined below.

"Interpolymer" means a polymer prepared by the polymerization of at least two different types of monomers. This generic term includes both classical copolymers, i.e., polymers prepared from two different types of monomers, and polymers prepared from more than two different types of monomers, e.g., terpolymers, tetrapolymers, etc.

"Mer", "mer unit" and like terms means that portion of a polymer derived from a single reactant molecule; for example, a mer unit derived from ethylene has the general formula —$CH_2CH_2$—.

"Blend," "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art.

"Composition", "formulation" and like terms means a mixture or blend of two or more components. In the context of this invention, the composition includes Components A-D plus any additives, fillers and the like.

"Additive" and like terms mean a compound, other than polypropylene, HDPE, PE copolymer, olefin block composite, nucleating agent or filler, that is added to the composition of this invention.

"Cable", "fiber optic cable" and like terms refer to at least one optical fiber within a protective element, e.g., a buffer tube and/or protective exterior jacket. Typically, a cable is two or more optical fibers bound together in one or more common protective elements. A typical cable design is illustrated in U.S. Pat. No. 5,574,816.

Polypropylene

The polypropylene component of the composition of this invention (component (A) above) is a propylene homopolymer and/or a high crystallinity polypropylene. "Propylene homopolymer" and similar terms mean a polymer comprising at least 98, or at least 99, or at least 99.5, weight percent (wt %) of units derived from propylene. In one embodiment the propylene homopolymer consists of, or consists essentially of, units derived from propylene. Polypropylene homopolymers are commercially available and include resins 5D49 (MFR=38 g/10 min) and 5E16S (MFR=40 g/10 min), among others, available from Braskem. MFR is measured by ASTM D1238 (230° C./2.16 Kg), and density is measured by ASTM D792.

In one embodiment the polypropylene is a high crystallinity polypropylene, more typically a high crystallinity polypropylene with an MFR of less than or equal to ($\leq$) 12 g/10 min (230° C./2.16 kg), even more typically with an MFR$\leq$4 g/10 min (230° C./2.16 kg). In one embodiment the high crystallinity polypropylene is a propylene homopolymer or mini-random copolymer (i.e., a propylene copolymer comprising 98% to less than 100% mer units derived from propylene monomer with the remainder of mer units derived from another olefin monomer, typically ethylene).

High crystallinity means that the polypropylene has crystallinity equal to or greater than 40%, preferably equal to or greater than 55%, as measured by differential scanning calorimetry (DSC) heat of fusion. DSC is a common technique that can be used to examine the melting and crystallization of crystalline and semi-crystalline polymers. General principles of DSC measurements and applications of DSC to studying crystalline and semi-crystalline polymers are described in standard texts (for instance, E. A. Turi, ed., "Thermal Characterization of Polymeric Materials", Academic Press, 1981).

The term "crystallinity" refers to the regularity of the arrangement of atoms or molecules forming a crystal structure. Polymer crystallinity can be examined using DSC. $T_{me}$ means the temperature at which the melting ends and $T_{max}$ means the peak melting temperature, both as determined by one of ordinary skill in the art from DSC analysis using data from the final heating step. One suitable method for DSC analysis uses a model Q1000™ DSC from TA Instruments, Inc. Calibration of the DSC is performed in the following manner. First, a baseline is obtained by heating the cell from −90° C. to 290° C. without any sample in the aluminum DSC pan. Then 7 milligrams of a fresh indium sample is analyzed by heating the sample to 180° C., cooling the sample to 140° C. at a cooling rate of 10° C./min followed by keeping the sample isothermally at 140° C. for 1 minute, followed by heating the sample from 140° C. to 180° C. at a heating rate of 10° C./min. The heat of fusion and the onset of melting of the indium sample are determined and checked to be within 0.5° C. from 156.6° C. for the onset of melting and within 0.5 J/g from 28.71 J/g for the heat of fusion. Then deionized water is analyzed by cooling a small drop of fresh sample in the DSC pan from 25° C. to −30° C. at a cooling rate of 10° C./min. The sample is kept isothermally at −30° C. for 2 minutes and heated to 30° C. at a heating rate of 10° C./min. The onset of melting is determined and checked to be within 0.5° C. from 0° C.

Samples of polymer are pressed into a thin film at a temperature of 177° C. About 5 to 8 mg of sample is weighed out and placed in a DSC pan. A lid is crimped on the pan to ensure a closed atmosphere. The sample pan is placed in the DSC cell and then heated at a high rate of about 100° C./min to a temperature of 230° C. The sample is kept at this temperature for about 3 minutes. Then the sample is cooled at a rate of 10° C./min to −40° C., and kept isothermally at that temperature for 3 minutes. Consequently the sample is heated at a rate of 10° C./min until melting is complete. The resulting enthalpy curves are analyzed for peak melt temperature, onset and peak crystallization temperatures, heat of fusion and heat of crystallization, $T_{me}$, $T_{max}$, and any other quantity of interest from the corresponding thermograms as described in U.S. Pat. No. 6,960,635. The factor that is used to convert heat of fusion into nominal weight percent crystallinity is 165 J/g=100 wt % crystallinity. With this conversion factor, the total crystallinity of a propylene-based polymer (units: weight percent crystallinity) is calculated as the heat of fusion divided by 165 J/g and multiplied by 100 percent. For impact copolymers the elastomeric impact modifier contributes negligibly to heat of fusion. As such, to calculate the crystallinity of impact copolymers in the context of determining whether the copolymer is of "high crystallinity", the result of the above calculation is further divided by a factor equal to one minus the weight fraction of elastomeric impact modifier.

High Density Polyethylene (HDPE)

The HDPE resins that can be used in the practice of this invention (component (B) above) are well known, commercially available, and made by any one of a wide variety of processes including, but not limited to, solution, gas or slurry phase; Ziegler-Natta or metallocene catalyzed; etc. These resins have a density of 0.94 to 0.98 g/cm$^3$ and a melt index ($I_2$) of 0.1 to 10.0 grams per 10 minutes (g/10 min). Density is measured by ASTM D792, and $I_2$ is measured by ASTM D1238 (190° C./2.16 Kg).

Commercially available HDPE resins include but are not limited to DOW High Density Polyethylene resins such as ELITE 5960G, HDPE KT 10000 UE, HDPE KS 10100 UE, and HDPE 35057E, AXELERON™ CS K-3364 NT CPD, CONTINUUM™ and UNIVAL™ high density polyethylene resins, all available from The Dow Chemical Company; BS2581 available from *Borealis*; Hostalen ACP 5831D available from Lyondell/Basell; HD5502S available from Ineos; B5823 and B5421 available from Sabic; HDPE 5802 and BM593 available from Total; and SURPASS™ available from Nova Chemicals Corporation.

In an embodiment, the HDPE has a density from 0.945 g/cm$^3$ to 0.975 g/cm$^3$, and a melt index from 0.1 g/10 min to 10.0 g/10 min. In an embodiment, the HDPE has a density from 0.950 g/cm$^3$ to 0.97 g/cm$^3$, and a melt index from 0.1 g/10 min to 10.0 g/10 min.

In an embodiment, the HDPE has a density from 0.95 g/cm$^3$ to 0.97 g/cm$^3$ and a melt index from 1.0 g/10 min to 3.0 g/10 min.

Propylene-Ethylene Copolymer (PE Copolymer)

The propylene-ethylene copolymer component of the composition of this invention (component (C) above) has a melt flow rate (MFR) in the range of from 0.1 to 25 grams per 10 minutes (g/10 min), measured in accordance with ASTM D1238 (at 230° C./2.16 Kg). For example, the propylene-ethylene copolymer may have a MFR in the range of 0.1 to 10, or in the alternative, 0.2 to 10, g/10 min.

The propylene-ethylene copolymer has a crystallinity in the range of from at least 1 to 30 wt % (a heat of fusion of at least 2 to less than 50 Joules/gram (J/g)). For example, the crystallinity can be from a lower limit of 1, 2.5, or 3, wt % (respectively, at least 2, 4, or 5 J/g) to an upper limit of 30, 24, 15 or 7, wt % (respectively, less than 50, 40, 24.8 or 11 J/g). For example, the propylene-ethylene copolymer may have a crystallinity in the range of from at least 1 to 24, 15, 7, or 5, wt % (respectively, at least 2 to less than 40, 24.8, 11, or 8.3 J/g). Crystallinity is measured via DSC method, as described above. The propylene-ethylene copolymer comprises units derived from propylene and ethylene.

The propylene-ethylene copolymer comprises from 1 to 40 wt % of one or more ethylene comonomer. For example, the ethylene comonomer content can be from a lower limit of 1, 3, 4, 5, 7 or 9, wt % to an upper limit of 40, 35, 30, 27, 20, 15, 12 or 9, wt %. For example, the propylene-ethylene copolymer comprises from 1 to 35 wt %, or, in alternatives, from 1 to 30, 3 to 27, 3 to 20, or from 3 to 15, wt %, of ethylene comonomer.

The propylene-ethylene copolymer has a molecular weight distribution (MWD), defined as weight average molecular weight divided by number average molecular weight (Mw/Mn) of 3.5 or less; in the alternative 3.0 or less; or in another alternative from 1.8 to 3.0.

Such propylene-ethylene copolymers, and the method of determining their MWD, are further described in U.S. Pat. Nos. 6,960,635 and 6,525,157. Such propylene-ethylene copolymers are commercially available from The Dow Chemical Company, under the trade name VERSIFY™, or from ExxonMobil Chemical Company, under the trade name VISTAMAXX™.

Olefin Block Composite

The olefin block composite component of the composition of this invention (component (D) above) comprises three components: (1) a soft copolymer, (2) a hard polymer, and (3) a block copolymer having a soft segment and a hard segment. The hard segment of the block copolymer is the same composition as the hard polymer in the block composite and the soft segment of the block copolymer is the same composition as the soft copolymer of the block composite.

The block copolymers present in the olefin block composite can be linear or branched. More specifically, when produced in a continuous process, the block composites can have a MWD, also known as a polydispersity index (PDI), from 1.7 to 15, from 1.8 to 3.5, from 1.8 to 2.2, or from 1.8 to 2.1. When produced in a batch or semi-batch process, the block composites can have a PDI from 1.0 to 2.9, from 1.3 to 2.5, from 1.4 to 2.0, or from 1.4 to 1.8.

The term "olefin block composite" refers to block composites prepared solely or substantially solely from two or more α-olefin types of monomers. In various embodiments, the olefin block composite can consist of only two α-olefin type monomer units. An example of an olefin block composite would be a hard segment and hard polymer comprising only or substantially only propylene monomer residues with a soft segment and soft polymer comprising only or substantially only ethylene and propylene comonomer residues.

In describing olefin block composites, "hard" segments refer to highly crystalline blocks of polymerized units in which a single monomer is present in an amount greater than 95 mol %, or greater than 98 mol %. In other words, the comonomer content in the hard segments is less than 5 mol %, or less than 2 mol %. In some embodiments, the hard segments comprise all or substantially all propylene units. "Soft" segments, on the other hand, refer to amorphous, substantially amorphous or elastomeric blocks of polymerized units having a comonomer content greater than 10 mol %. In some embodiments, the soft segments comprise ethylene/propylene interpolymers. Comonomer content in the block composites may be measured using any suitable technique, such as NMR spectroscopy.

The term "crystalline," when used to describe olefin block composites, refers to a polymer or polymer block that possesses a first order transition or crystalline melting point ("Tm") as determined by differential scanning calorimetry ("DSC") or equivalent technique. The term "crystalline" may be used interchangeably with the term "semi-crystalline." The term "amorphous" refers to a polymer lacking a crystalline melting point. The term, "isotactic" denotes polymer repeat units having at least 70 percent isotactic pentads as determined by $^{13}$C-nuclear magnetic resonance ("NMR") analysis. "Highly isotactic" denotes polymers having at least 90 percent isotactic pentads.

When referring to olefin block composites, the term "block copolymer" or "segmented copolymer" refers to a polymer comprising two or more chemically distinct regions or segments (referred to as "blocks") joined in a linear manner, that is, a polymer comprising chemically differentiated units which are joined end-to-end with respect to polymerized ethylenic functionality, rather than in pendent or grafted fashion. In an embodiment, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The olefin block composites employed herein are characterized by unique distributions of polymer PDI, block length distribution, and/or block number distribution, due, in a preferred embodiment, to the effect of shuttling agent(s) in combination with the catalyst(s) used in preparing the block composites.

In an embodiment the olefin diblock composite comprises an ethylene-propylene/isotactic polypropylene (EP-iPP) diblock polymer that has an ethylene content from 43 to 48 wt %, or from 43.5 to 47 wt %, or from 44 to 47 wt %, based on the weight of the diblock copolymer. In an embodiment, the EP-iPP diblock polymer has a propylene content from 57 to 52 wt %, or from 56.5 to 53 wt %, or from 56 to 53 wt %, based on the weight of the EP-iPP diblock polymer.

The olefin block composite employed herein can be prepared by a process comprising contacting an addition polymerizable monomer or mixture of monomers under addition polymerization conditions with a composition comprising at least one addition polymerization catalyst, a cocatalyst and a chain shuttling agent ("CSA"), the process being characterized by formation of at least some of the growing polymer chains under differentiated process conditions in two or more reactors operating under steady state polymerization conditions or in two or more zones of a reactor operating under plug flow polymerization conditions.

Further, the EP-iPP diblock polymers of the block composites comprise from 10 to 90 wt % hard segments and 90 to 10 wt % soft segments.

Within the soft segments, the weight percent ethylene may range from 10% to 75%, or from 30% to 70%. In an embodiment, propylene constitutes the remainder of the soft segment.

Within the hard segments, the weight percent propylene may range from 80% to 100%. The hard segments can comprise greater than 90 wt %, 95 wt %, or 98 wt % propylene.

The block composites described herein may be differentiated from conventional, random copolymers, physical blends of polymers, and block copolymers prepared via sequential monomer addition. The block composites may be differentiated from random copolymers by characteristics such as higher melting temperatures for a comparable amount of comonomer, block composite index, as described below; from a physical blend by characteristics such as block composite index, better tensile strength, improved fracture strength, finer morphology, improved optics, and greater impact strength at lower temperature; from block copolymers prepared by sequential monomer addition by molecular weight distribution, rheology, shear thinning, rheology ratio, and in that there is block polydispersity.

In some embodiments, the block composites have a Block Composite Index ("BCI"), as defined below, that is greater than zero but less than 0.4, or from 0.1 to 0.3. In other embodiments, BCI is greater than 0.4 and up to 1.0. Additionally, the BCI can range from 0.4 to 0.7, from 0.5 to 0.7, or from 0.6 to 0.9. In some embodiments, BCI ranges from 0.3 to 0.9, from 0.3 to 0.8, from 0.3 to 0.7, from 0.3 to 0.6, from 0.3 to 0.5, or from 0.3 to 0.4. In other embodiments, BCI ranges from 0.4 to 1.0, from 0.5 to 1.0, from 0.6 to 1.0, from 0.7 to 1.0, from 0.8 to 1.0, or from 0.9 to 1.0. BCI is herein defined to equal the weight percentage of diblock copolymer divided by 100% (i.e., weight fraction). The value of the block composite index can range from 0 to 1, wherein 1 would be equal to 100% diblock and zero would be for a material such as a traditional blend or random copolymer. Methods for determining BCI can be found, for example, in U.S. Published Patent Application No. 2011/0082258 from paragraph [0170] to [0189].

The olefin block composites can have a crystalline melting point (Tm) greater than 100° C., preferably greater than 120° C., and more preferably greater than 125° C. The melt index ("$I_2$") of the block composite can range from 0.1 to 1000 g/10 min., from 0.1 to 50 g/10 min., from 0.1 to 30 g/10 min., or from 1 to 10 g/10 min measured according to ASTM D1238 at 190° C./2.16 Kg. The block composites can have a weight average molecular weight ("Mw") from 10,000 to 2,500,000, from 35,000 to 1,000,000, from 50,000 to 300,000, or from 50,000 to 200,000 g/mol as measured using standard gel permeation chromatography (GPC) techniques.

Processes useful in producing the olefin block composites suitable for use in the present invention may be found, for example, in U.S. Patent Application Publication No. 2008/0269412, published on Oct. 30, 2008. Suitable catalysts and catalyst precursors for use in the present invention include metal complexes such as disclosed in WO 2005/090426, in particular, those disclosed starting on page 20, line 30 through page 53, line 20. Suitable catalysts are also disclosed in U.S. 2006/0199930; U.S. 2007/0167578; U.S. 2008/0311812; U.S. 2011/0082258; U.S. Pat. No. 7,355,089; and WO 2009/012215. Suitable co-catalysts are those disclosed in WO 2005/090426, in particular, those disclosed on page 54, line 1 to page 60, line 12. Suitable chain shuttling agents are those disclosed in WO 2005/090426, in particular, those disclosed on page 19, line 21 through page 20 line 12. Particularly preferred chain shuttling agents are dialkyl zinc compounds. The olefin block composites themselves are more fully described in U.S. Pat. No. 8,476,366.

In an embodiment, the EP/iPP diblock polymer has a density from 0.89 to 0.93 g/cc, or from 0.90 to 0.93 g/cc measured according to ASTM D792, and/or a melt flow rate (MFR) from 6.5 to 12 g/10 min, or from 7 to 10 g/10 min, measured according to ASTM D1238 at 230° C./2.16 kg.

Optional Components

In one embodiment the compositions of this invention can contain one or more optional components, e.g., nucleating agents, fillers, antioxidants and other additives. These optional components are used in known ways and in known amounts.

Nucleating Agents

Any compound that will initiate and/or promote the crystallization of the polymer components of the composition of this invention can be used as the nucleating agent. Examples of suitable nucleating agents include, but are not limited to, ADK NA-11 (CAS#85209-91-2), available commercially from Asahi Denim Kokai; HYPERFORM™ HPN-20E, available from Milliken Chemical; talc and calcium carbonate. Persons of ordinary skill in the art can readily identify other useful nucleating agents. If used, the nucleating agents are typically included in the inventive composition in amounts ranging from 0.05 to 5.0 wt %, from 0.09 to 2.0 wt %, or from 0.1 to 1.0 wt % based on the weight of the composition. In the absence of a filler, typically the amount of nucleating agent present in the composition is less than 1.0 wt %.

Filler

In one embodiment the compositions of this invention optionally can comprise a filler. Any filler known to a person of ordinary skill in the art may be used in the compositions of this invention. Non-limiting examples of suitable fillers include titanium dioxide, sand, talc, dolomite, calcium carbonate, clay, silica, mica, carbon black, graphite, wollastonite, feldspar, aluminum silicate, alumina, hydrated alumina, glass bead, glass microsphere, ceramic microsphere, thermoplastic microsphere, barite, wood flour, and combinations of two or more of these materials. If a filler is used, then titanium dioxide is preferred, and it is typically used in an amount from 300 to 10,000 parts per million (ppm) (0.03 to 1 wt %) based on the weight of the composition. If other fillers are used, either alone or in combination with titanium dioxide or one or more other fillers, the total amount of filler is typically in the range from 0.10 to 20 wt % based on the weight of the composition. In some embodiments, a nucleating agent, e.g., talc, calcium carbonate, etc., can also act as a filler, and vice versa.

Additives

In one embodiment the composition of this invention may optionally comprise one or more additives. Any additive may be incorporated into the resin composition so long as the objects of the disclosure are not compromised. Nonlimiting examples of such additives include antioxidants, acid scavengers, heat stabilizers, light stabilizers, ultraviolet light absorbers, lubricants, antistatic agents, pigments, dyes, dispersing agents, inhibitors, neutralizing agents, foaming agents, plasticizers, flowability improvers, anti-blocking agents, slip additives, and weld strength improvers. Examples of antioxidants are hindered phenols (such as, for example, IRGANOX™ 1010) and phosphites (for example, IRGAFOS™ 168) both commercially available from BASF.

The additives may be employed alone or in any combination, and they are used, if used at all, in known amounts and in known ways, i.e., in functionally equivalent amounts known to those skilled in the art. For example, the amount of antioxidant employed is that amount which prevents the polymer blend from undergoing oxidation at the temperatures and environment employed during storage and ultimate use of the polymers. Such amount of antioxidants is usually in the range of from 0.0001 to 10, preferably from 0.001 to 5, more preferably from 0.01 to 2, wt % based upon the weight of the composition. Similarly, the amounts of any of the other enumerated additives are the functionally equivalent amounts.

Composition

The relative amounts of each component of the composition of this invention are described in Table 1.

TABLE 1

Component Amounts (Wt %) in the Composition

| Component | Broad Range | Preferred Range | More Preferred Range |
|---|---|---|---|
| PP | 15-70 | 20-70 | 20-65 |
| HDPE | 15-70 | 15-60 | 20-60 |
| PE Copolymer | >0-30 | 0.5-25 | 1-20 |
| Olefin Block Composite | 2-15 | 2.5-15 | 2.5-10 |
| Nucleating Agent | 0-5 | 0.05-5 | 0.09-2 |
| Filler | 0-20 | 0.03-20 | 0.3-1 |
| Additives | 0-10 | 0.0001-10 | 0.01-2 |

In one embodiment the weight ratio of PP to HDPE is greater than (>) 1, preferably >1.5. In one embodiment the amount of PE copolymer in the composition ranges from greater than zero (>0), or 0.1, or 0.5, or 1, or, 2, or 3, or 4, or 5, or 10 to less than or equal to (≤) 30, or 25, or, 20, or 15, weight percent (wt %) based on the weight of the composition.

Compounding

Compounding of the compositions of this invention can be performed by standard means known to those skilled in the art. Examples of compounding equipment are internal batch mixers, such as a BANBURY™ or BOLLING™ internal mixer. Alternatively, continuous single or twin screw mixers can be used, such as a FARREL™ continuous mixer, a WERNER AND PFLEIDERER™ twin screw mixer, or a BUSS™ kneading continuous extruder. The type of mixer utilized, and the operating conditions of the mixer, will affect properties of the composition such as viscosity, volume resistivity, and extruded surface smoothness.

The compounding temperature of the polypropylene, HDPE, PE copolymer and olefin block composite, and any optional additive packages, will vary with the composition, but it is typically in excess of 180° C. For a 3:1 weight ratio of polypropylene to HDPE, the compounding temperature is typically in excess of 245° C. The various components of the final composition can be added to and compounded with one another in any order, or simultaneously, but typically the polypropylene, HDPE, PE copolymer and olefin block composite are first compounded with one another, and then with the nucleating agent, filler and/or additives. In some embodiments the additives are added as a pre-mixed masterbatch. Such masterbatches are commonly formed by dispersing the additives, either separately or together, in a small amount of one or more of the polypropylene and HDPE. Masterbatches are conveniently formed by melt compounding methods.

Protective Element

Buffer Tube

In one embodiment, the invention relates to reduced stress whitening in buffer tubes as compared to the typical PP copolymer-based material used for these applications. The improvement in stress whitening is achieved by blending a homopolymer PP and/or a high crystalline polypropylene with an HDPE, a PE copolymer, an olefin block composite and, optionally, one or more or a nucleating agent, filler and other additives, e.g., an antioxidant. The buffer tubes of this invention typically exhibit one or more of the following properties in addition to reduced stress whitening: (1) low grease absorption, (2) high retention of secant modulus after aging, and (3) good impact strength as measured by low temperature brittleness, all as compared to a conventional buffer tube made from a PP copolymer. Buffer tubes and fiber optic cables comprising buffer tubes are more fully described in WO 2015/054896.

Exterior Jacket

In one embodiment the invention relates to reduced stress whitening in protective exterior jackets as compared to the typical PP copolymer-based material used for these applications. The improvement in stress whitening is achieved by blending a homopolymer PP and/or a high crystalline polypropylene with an HDPE, a PE copolymer, an olefin block composite and, optionally, one or more or a nucleating agent, filler and other additives, e.g., an antioxidant. The protective exterior jackets of this invention typically exhibit one or more of the following properties in addition to reduced stress whitening: (1) low grease absorption, (2) high retention of secant modulus after aging, and (3) good impact strength as measured by low temperature brittleness, all as compared to a conventional protective exterior jacket made from a PP copolymer.

Molecular Weight Distribution (MWD)

The molecular weight and MWD of the various polymers used in the composition of this invention is measured using a gel permeation chromatography ("GPC") system that consists of a Polymer Char GPC-IR High Temperature Chromatograph, equipped with an IR4 infra-red detector from Polymer ChAR (Valencia, Spain). Data collection and processing is performed using Polymer Char software. The system is also equipped with an on-line solvent degassing device.

Suitable high temperature GPC columns can be used, such as four 30 cm long Shodex HT803 13 micron columns, or four 30 cm Polymer Labs columns of 13-micron mixed-pore-size packing (Olexis LS, Polymer Labs). The sample carousel compartment is operated at 140° C., and the column compartment is operated at 150° C. The samples are prepared at a concentration of 0.1 grams of polymer in 50 milliliters of solvent. The chromatographic solvent and the sample preparation solvent is 1,2,4-trichlorobenzene ("TCB") containing 200 ppm of 2,6-di-tert-butyl-4methyl-phenol ("BHT"). The solvent is sparged with nitrogen. The polymer samples are stirred at 160° C. for four hours. The injection volume is 200 microliters. The flow rate through the GPC is set at 1 mL/minute.

The GPC column set is calibrated by running 21 narrow molecular weight distribution polystyrene standards. The molecular weight ("MW") of the standards ranges from 580 g/mol to 8,400,000 g/mol, and the standards are contained in 6 "cocktail" mixtures. Each standard mixture has at least a decade of separation between individual molecular weights. The standard mixtures are purchased from Polymer Laboratories. The polystyrene standards are prepared at 0.025 g in 50 mL of solvent for molecular weights equal to, or greater than, 1,000,000 g/mol, and at 0.05 g in 50 mL of solvent for molecular weights less than 1,000,000 g/mol. The polystyrene standards are dissolved at 80° C., with agitation, for 30 minutes. The narrow standards mixtures are run first, and in order of decreasing highest molecular weight component to minimize degradation. The polystyrene standard peak molecular weights are converted to polyethylene molecular weight using Equation (1) (as described in Williams and Ward, J. Polym. Sci., Polym. Letters, 6, 621 (1968)):

$$M{\rm polyethylene} = A \times (M{\rm polystyrene})^B \qquad ({\rm Eq.\ 1})$$

where M is the molecular weight of polyethylene or polystyrene (as marked), and B is equal to 1.0. It is known to those of ordinary skill in the art that A may be in a range of about 0.38 to about 0.44, and is determined at the time of calibration using a broad polyethylene standard, as discussed below. Use of this polyethylene calibration method to obtain molecular weight values, such as the molecular weight distribution (MWD or Mw/Mn), and related statistics, is defined here as the modified method of Williams and Ward. The number average molecular weight, the weight average molecular weight, and the z-average molecular weight are calculated from the following equations.

$$Mw_{CC} = \sum_i \left( \frac{C_i}{\sum_i C_i} \right) M_i = \sum_i w_i M_{cc,i} \qquad ({\rm Eq.\ 2})$$

$$M_{n,cc} = \sum w_i / \sum (w_i / M_{cc,i}) \qquad ({\rm Eq.\ 3})$$

$$M_{z,cc} = \sum (w_i M_{cc,i}^2) / \sum (w_i M_{cc,i}) \qquad ({\rm Eq.\ 4})$$

EXAMPLES

Materials

PP 9006 is a polypropylene homopolymer (>99 wt % mer units derived from propylene, MFR of 6.0, g/10 min at 230° C./2.16 Kg) available from Sinopec Maoming Company.

AFFINITY 1880G is an ethylene-1-octene copolymer (0.902 g/cm$^3$ density; 1.0 $I_2$) available from The Dow Chemical Company VERSIFY 3401 is a propylene-ethylene copolymer (8.0 MFR; 0.865 g/cm$^3$ density; Mw of 187,500 g/mol; Mn of 73,060 g/mol; MWD of 2.57; ethylene content of 13%; crystallinity of 6.9%; and a crystalline melting point (Tm) of 97° C.) available from The Dow Chemical Company.

DMDA-1250 NT is a bimodal HDPE (1.5 $I_2$; 0.955 g/cm$^3$ density) available from The Dow Chemical Company.

ELITE 5960G is an enhanced HDPE (0.85 $I_2$; 0.962 g/cm$^3$ density) available from The Dow Chemical Company.

The olefin block composite is an EP/iPP diblock obtained from The Dow Chemical Company and with the properties reported in Tables A and B below.

TABLE A

EP/iPP Properties

| MFR (230° C./ 2.16 kg) | wt % PP (from HTLC* Separation) | Mw (Kg/mol) | Mw/Mn | Total wt % C$_2$** (NMR) | Tm (° C.) Peak 1 (Peak 2) | Tc (° C.) | Melt Enthalpy (J/g) |
| --- | --- | --- | --- | --- | --- | --- | --- |
| 9.8 | 19.9 | 104 | 2.73 | 47.6 | 107.9 (130.0) | 87.8 | 95 |

*High Temperature Liquid Chromatography
**C$_2$ = Ethylene

TABLE B

Crystalline Block Composite Index Estimation

| wt % iPP | wt % EP | wt % C$_2$ in EP | wt % C$_2$ in iPP | Crystalline Block Composite Index |
| --- | --- | --- | --- | --- |
| 50 | 50 | 90 | 1 | 0.549 |

DHT-4A is a synthetic hydrotalcite acid scavenger available from Kisuma Chemicals.

NA-11A is nucleating agent (CAS number 85209-91-2) for polypropylene and is available from Amfine Chemical Corporation.

IRGANOX 1010 is a sterically hindered phenolic primary antioxidant (pentaerythritol tetrakis(3-(3,5-di-tert-butyl-4-hydroxyphenyl)propionate) CAS Number 6683-19-8) available from BASF.

IRGANOX 168 is an antioxidant (tris(2,4-ditert-butylphenyl) phosphite, CAS number 31570-04-4) available from BASF.

Preparation of Samples

LEISTRITZ 28 co-rotating intermeshing 48/1 L/D, 27-mm twin-screw extruder is used in the preparation of the samples. Key parameters are as follows: Screw diameter of 27 mm, screw flight depth of 4.5 mm, machine run at 120 kg/h maximum output, and 106 Nm maximum shaft torque, and a 29 KW drive with a maximum of 1200 RPM drive speed. The extruder is equipped with 12 temperature control zones including the die. A Strand pelletization system is used to get compound pellets with a 4.0 m length of water trough for cooling followed by an air knife for strand drying. All the formulation ingredients are dry blended then fed into the extruder using a K-Tron loss-in-weight feeder. The screw speed is set to 200 rpm and the output to 10 kg/h. The temperature profile is as follows: (feed zone to die): cooled/160/190/220/230/230/230/230/230/230/230/235° C.

Specimens for impact strength, Young's tensile modulus, and tensile stress and elongation of onset whitening are prepared via injection molding. Prior to injection molding, compound pellets are dried using a desiccant dryer at 70° C. for 6 hours. The injection molding is conducted on a FANUC, ϕ28 machine.

Results

The inventive (IE) and comparative (CE) examples are subjected to testing for stress whitening at the onset of tensile elongation, 1% secant modulus, tensile strength, and impact strength at both room temperature (about 23° C.) and −23° C. The results are reported in Tables 2 and 3.

TABLE 2

Compounds and Results

| Material | Description | CE-1 wt % | CE-2 wt % | CE-3 wt % | CE-4 wt % | CE-5 wt % | CE-6 wt % | IE-1 wt % | IE-2 wt % |
|---|---|---|---|---|---|---|---|---|---|
| PP 9006 | homo PP, | 82.335 | 64.335 | 64.335 | 64.335 | 64.335 | 87.335 | 64.335 | 64.335 |
| AFFINITY 1880G | ethylene-octene (0.902 den, 1.0 Ml) | 12 | | | 10 | 10 | | | |
| VERSIFY 3401 | PP-PE copolymer, 8.0 MFR, 0.865 den | | | | | | 12 | 10 | 10 |
| DMDA-1250 NT | Bimodal HDPE (1.5 Ml, 0.955 den) | | 30 | | 20 | | | 20 | |
| ELITE 5960G | Enhanced HDPE (0.85 Ml, 0.962 den) | | | 30 | | 20 | | | 20 |
| EP/iPP | diblock | 5 | 5 | 5 | 5 | 5 | | 5 | 5 |
| DHT-4A | acid scavenger | 0.025 | 0.025 | 0.025 | 0.025 | 0.025 | 0.025 | 0.025 | 0.025 |
| NA-11A | Nucleating Agent | 0.14 | 0.14 | 0.14 | 0.14 | 0.14 | 0.14 | 0.14 | 0.14 |
| IRGANOX 1010 | anti-oxidant | 0.4 | 0.4 | 0.4 | 0.4 | 0.4 | 0.4 | 0.4 | 0.4 |
| IRGANOX 168 | anti-oxidant | 0.1 | 0.1 | 0.1 | 0.1 | 0.1 | 0.1 | 0.1 | 0.1 |
| Total | | 100 | 100 | 100 | 100 | 100 | 100 | 100 | 100 |
| | Test Method | | | | | | | | |
| TE* onset stress whitening (%) | ASTM D638*** | 6.17 | 9.44 | 7.65 | 8.07 | 9.48 | 8.64 | 12.50 | 11.79 |
| Elongation change (%) | ASTM D638 | 0.0 | 53.0 | 24.0 | 30.8 | 53.6 | 40.0 | 102.6 | 91.1 |
| 1% Secant modulus | ASTM D638 | 1443 | 1425 | 1563 | 1340 | 1420 | 1350 | 1177 | 1287 |
| TS**, Mpa | ASTM D638 | 30.7 | 30.6 | 32.8 | 28.5 | 30.5 | 27.7 | 26.9 | 29.2 |
| Impact Strength (RT) | ASTM D256 | 70.63 | 40.98 | 41.04 | 63.49 | 54.22 | 100.73 | 85.94 | 79.46 |
| Impact Strength (−23 C.) | ASTM D256 | 21.11 | 20.98 | 21.14 | 22.29 | 22.16 | 19.82 | 21.35 | 20.98 |

*TE = Tensile Elongation
**TS = Tensile Strength
***The molded tensile bars specimen are tested per a modified ASTM D 638 method. The speed at which the specimens are pulled is modified to a slower speed of 5 mm/min, compared to the 50 mm/min specified in ASTM D638. The slower pull rate allows the test to be stopped and percent elongation to be recorded when stress whitening is first visually observed. A optical extensometer is equipped on INSTRON to observe the whitening.

TABLE 3

Additional Runs for Compound and Results

| Material | IE3 | IE4 | IE5 | IE6 | IE7 | CE7 | CE8 | CE9 | CE10 | CE11 | CE12 |
|---|---|---|---|---|---|---|---|---|---|---|---|
| PP 9006 | 54.335 | 24.335 | 56.835 | 19.335 | 44.335 | 59.335 | 29.335 | 34.335 | 59.335 | 69.335 | 69.335 |
| AFFINITY 1880G | | | | | | | | | | | |
| VERSIFY 3401 | 10 | 10 | 10 | 10 | 20 | 10 | 10 | | | 10 | 10 |
| DMDA-1250 NT | 30 | 60 | 30 | 60 | 30 | 30 | 60 | 60 | 30 | 20 | |
| ELITE 5960G | | | | | | | | | | | 20 |
| EP/iPP | 5 | 5 | 2.5 | 10 | 5 | | | 5 | 10 | | |
| DHT-4A | 0.025 | 0.025 | 0.025 | 0.025 | 0.025 | 0.025 | 0.025 | 0.025 | 0.025 | 0.025 | 0.025 |
| NA-11A | 0.14 | 0.14 | 0.14 | 0.14 | 0.14 | 0.14 | 0.14 | 0.14 | 0.14 | 0.14 | 0.14 |
| IRGANOX 1010 | 0.4 | 0.4 | 0.4 | 0.4 | 0.4 | 0.4 | 0.4 | 0.4 | 0.4 | 0.4 | 0.4 |
| IRGANOX 168 | 0.1 | 0.1 | 0.1 | 0.1 | 0.1 | 0.1 | 0.1 | 0.1 | 0.1 | 0.1 | 0.1 |
| Total | 100 | 100 | 100 | 100 | 100 | 100 | 100 | 100 | 100 | 100 | 100 |
| TE onset stress whitening (%) | 20.99 | 70.23 | 23.02 | 51.87 | 62.52 | 10.60 | 40.95 | 13.72 | 9.31 | 10.75 | 10.50 |

TABLE 3-continued

Additional Runs for Compound and Results

| Material | IE3 | IE4 | IE5 | IE6 | IE7 | CE7 | CE8 | CE9 | CE10 | CE11 | CE12 |
|---|---|---|---|---|---|---|---|---|---|---|---|
| *Elongation change (%) | 240.2 | 1038.2 | 273.1 | 740.7 | 913.3 | 71.8 | 563.7 | 122.4 | 50.9 | 74.2 | 70.2 |
| 1% Secant modulus | 1220 | 888 | 1339 | 800 | 961 | 1348 | 993 | 1239 | 1545 | 1373 | 1395 |
| TS, Mpa | 25.8 | 19.6 | 26.3 | 18.5 | 19.2 | 26.3 | 21.3 | 26.2 | 30.5 | 29.3 | 28.90 |
| Impact Strength (RT) | 140.29 | 400.54 | 111.85 | 474.01 | 602.01 | 76.37 | 301.59 | 43.22 | 38.79 | 79.27 | 108.18 |
| Impact Strength (−23 C.) | 23.12 | 36.15 | 22.55 | 35.38 | 40.38 | 21.53 | 36.06 | 24.90 | 20.13 | 19.24 | 20.19 |

*This is relative elongation for stress whitening versus CE1 in Table 2.

Data in Table 2 show significant improvement in the elongation for onset of stress whitening for the PP/VERSIFY/HDPE tri-blend compatibilized with EP/iPP di-block composite compared to compatibilized PP/HDPE and PP/AFFINITY as well as non-compatibilized PP/VERSIFY blends.

AFFINITY does not show the significant improvement on stress whitening either when used by itself (CE-1) or in combination with HDPE of different densities and molecular structure (CE-4 and CE-5).

VERSIFY shows the improvement in a tri-blend (PP/HDPE/VERSIFY) compatibilized with EP/iPP (IE-1 and IE-2); it does not show the improvement when used alone with PP (CE-6).

EP/iPP compatibilized PP/HDPE (CE-2) lacks the improvement of IE-1 and IE-2.

Data in Table 3 show significant improvement in the percent tensile elongation for onset of stress whitening for the PP/VERSIFY/HDPE tri-blends compatibilized with EP/iPP di-block composite (IE-3 and IE-4) compared to their non-compatibilized counterpart PP/VERSIFY/HDPE tri-blends (CE-7 and CE-8)]

PP/VERSIFY/HDPE tri-blends compatibilized with EP/iPP show significant improvement on stress whitening compared to PP/HDPE/EP-iPP blends without VERSIFY (CE-9 and CE-10).

PP/VERSIFY/HDPE tri-blends compatibilized with EP/iPP (IE-1 and IE-2) show significant improvement on stress whitening compared to non-compatibilized PP/VERSIFY/HDPE tri-blends (CE-11 and CE-12).

The invention claimed is:

1. A composition comprising in weight percent (wt %) based on the weight of the composition:
    (A) 15-70 wt % polypropylene (PP),
    (B) 15-70 wt % high density polyethylene (HDPE),
    (C) >0-30 wt % propylene-ethylene copolymer (PE copolymer),
    (D) 2-15 wt % olefin block composite, and
    (E) 0-20 wt % of one or more of a nucleating agent, filler and additive, with the proviso that the weight ratio of PP to HDPE is greater than (>) 1.

2. The composition of claim 1 in which the polypropylene is a propylene homopolymer or high crystallinity polypropylene.

3. The composition of claim 1 in which the HDPE has a density of 0.94 to 0.98 g/cm$^3$ and a melt index of 0.1 to 10 g/10 min.

4. The composition of any of claim 1 in which the PE copolymer has an MFR from 0.1 to 10 g/10 min, a crystallinity of at least 1 to 30%, an MWD of 3.5 or less, and an ethylene content from 1 to 40 wt %.

5. The composition of claim 1 in which the olefin block composite has a PDI from 1.7 to 15.

6. The composition of claim 1 in which the olefin block composite comprises an ethylene-propylene/isotactic polypropylene (EP-iPP) diblock copolymer that has an ethylene content from 43 to 48 wt % based on the weight of the diblock copolymer.

7. The composition of claim 1 in which the olefin block composite has a BCI from greater than zero to less than 0.4.

8. The composition of claim 1 in which at least one of the optional nucleating agent, filler and additive is present.

9. The composition of claim 1 further comprising titanium dioxide.

10. The composition of claim 1 further comprising an antioxidant.

11. A protective element for a fiber optic cable made from the composition of claim 1.

12. The protective element of claim 11 in the form of a buffer tube.

13. A fiber optic cable comprising the protective element of claim 11.

14. A fiber optic cable comprising the buffer tube of claim 12.

* * * * *